(12) United States Patent
Kluge et al.

(10) Patent No.: US 7,784,573 B2
(45) Date of Patent: Aug. 31, 2010

(54) DOUBLE CLUTCH FOR A HYBRID DRIVE

(75) Inventors: Marc Kluge, Besigheim (DE); Edmund Sander, Leonberg (DE)

(73) Assignee: Dr. Ing. h.c.F Porsche Aktiengesellschaft (DE)

( * ) Notice: Subject to any disclaimer, the term of this patent is extended or adjusted under 35 U.S.C. 154(b) by 441 days.

(21) Appl. No.: 11/955,829

(22) Filed: Dec. 13, 2007

(65) Prior Publication Data

US 2008/0142283 A1   Jun. 19, 2008

(30) Foreign Application Priority Data

Dec. 14, 2006   (DE) ..................... 10 2006 058 947

(51) Int. Cl.
*B60K 6/42* (2007.10)

(52) U.S. Cl. .............. 180/65.22; 180/65.235; 477/5; 192/48.8; 74/331; 903/902

(58) Field of Classification Search .......... 180/65.21, 180/65.22, 65.235, 65.6, 65.7, 293; 903/902, 903/909, 945; 477/5, 39, 70, 74, 77, 79, 477/166; 192/48.4, 48.8; 74/330, 331, 665 D See application file for complete search history.

(56) References Cited

U.S. PATENT DOCUMENTS

| | | | | |
|---|---|---|---|---|
| 4,463,621 | A * | 8/1984 | Fisher | 74/330 |
| 5,181,431 | A * | 1/1993 | Zaiser et al. | 74/333 |
| 5,388,472 | A * | 2/1995 | Alfredsson | 74/331 |
| 5,950,781 | A * | 9/1999 | Adamis et al. | 192/3.61 |
| 6,244,123 | B1 * | 6/2001 | Hegerath et al. | 74/325 |
| 6,499,370 | B2 * | 12/2002 | Bowen | 74/330 |
| 6,634,247 | B2 * | 10/2003 | Pels et al. | 74/329 |
| 6,887,180 | B2 * | 5/2005 | Pels et al. | 477/3 |
| 6,941,830 | B2 * | 9/2005 | Ibamoto et al. | 74/339 |
| 7,082,850 | B2 * | 8/2006 | Hughes | 74/329 |
| 7,185,722 | B1 * | 3/2007 | Sakamoto et al. | 180/65.25 |
| 7,243,565 | B2 * | 7/2007 | Soeda | 74/329 |
| 7,291,092 | B2 * | 11/2007 | Tohta et al. | 477/98 |
| 7,367,416 | B2 * | 5/2008 | Seufert et al. | 180/65.31 |
| 7,377,191 | B2 * | 5/2008 | Gitt | 74/330 |
| 7,462,121 | B2 * | 12/2008 | Janson et al. | 475/5 |
| 7,464,616 | B2 * | 12/2008 | Leibbrandt et al. | 74/331 |
| 7,469,613 | B2 * | 12/2008 | Krauss et al. | 74/340 |
| 7,490,526 | B2 * | 2/2009 | Forsyth | 74/330 |
| 7,540,823 | B2 * | 6/2009 | Kilian et al. | 477/3 |

(Continued)

FOREIGN PATENT DOCUMENTS

DE   10 2004 062 530 A1   10/2005

(Continued)

*Primary Examiner*—Paul N Dickson
*Assistant Examiner*—Brodie Follman
(74) *Attorney, Agent, or Firm*—Gerald E. Hespos; Michael J. Porco

(57) ABSTRACT

A double clutch for a hybrid drive of a motor vehicle, has an input shaft that can be driven by an internal combustion engine, and an output shaft that is connected to a transmission. An intermediate shaft extends coaxially to the output shaft and can be driven by an electric motor. The input shaft and the intermediate shaft can be coupled together by a first clutch of the double clutch. The intermediate shaft and the output shaft can be coupled together by a second clutch of the double clutch.

15 Claims, 4 Drawing Sheets

U.S. PATENT DOCUMENTS

| | | | |
|---|---|---|---|
| 7,604,565 B2* | 10/2009 | Lee et al. | 477/3 |
| 2002/0088289 A1* | 7/2002 | Bowen | 74/331 |
| 2002/0177504 A1* | 11/2002 | Pels et al. | 477/3 |
| 2003/0051577 A1* | 3/2003 | Hirt | 74/664 |
| 2003/0217617 A1* | 11/2003 | Sakamoto et al. | 74/665 B |
| 2004/0112158 A1* | 6/2004 | Norum et al. | 74/335 |
| 2004/0112171 A1* | 6/2004 | Kuhstrebe et al. | 74/730.1 |
| 2004/0149080 A1* | 8/2004 | Pollak | 74/661 |
| 2005/0101432 A1* | 5/2005 | Pels et al. | 477/5 |
| 2005/0139035 A1* | 6/2005 | Lee et al. | 74/661 |
| 2005/0224264 A1* | 10/2005 | Perrin | 180/65.2 |
| 2005/0279543 A1* | 12/2005 | Seufert et al. | 180/65.2 |
| 2006/0048594 A1* | 3/2006 | Gumpoltsberger et al. | 74/331 |
| 2006/0117882 A1* | 6/2006 | Gitt | 74/340 |
| 2006/0230854 A1* | 10/2006 | Enstrom et al. | 74/331 |
| 2006/0230855 A1* | 10/2006 | Leibbrandt et al. | 74/335 |
| 2007/0028718 A1* | 2/2007 | Lee et al. | 74/661 |
| 2007/0175723 A1* | 8/2007 | Blessing et al. | 192/48.8 |
| 2007/0213163 A1* | 9/2007 | Combes et al. | 475/100 |
| 2008/0000311 A1* | 1/2008 | Baldwin | 74/331 |
| 2008/0029361 A1* | 2/2008 | DeRoo et al. | 192/48.8 |
| 2008/0142283 A1* | 6/2008 | Kluge et al. | 180/65.2 |

FOREIGN PATENT DOCUMENTS

JP      2008150033 A * 7/2008

* cited by examiner

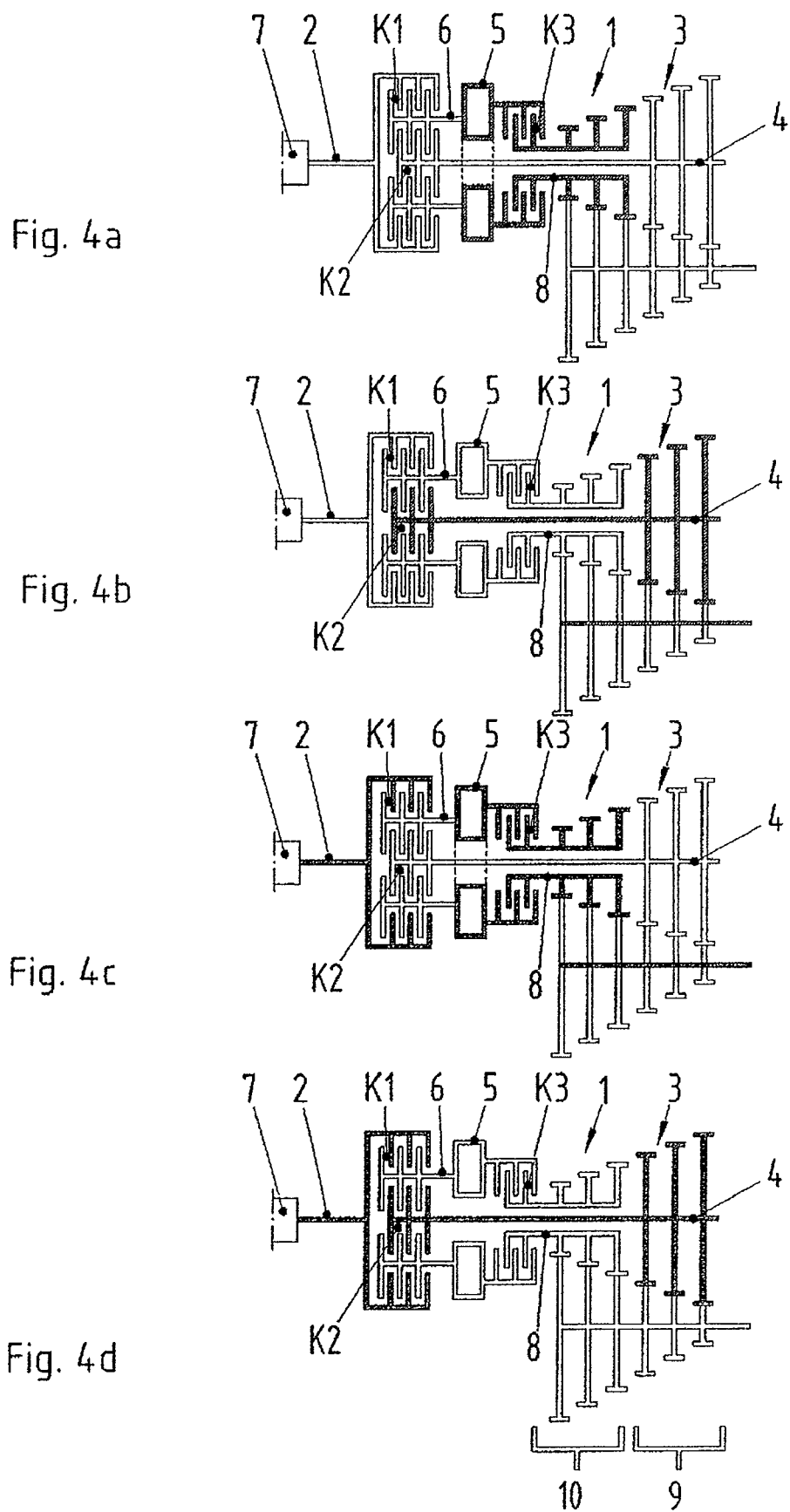

DOUBLE CLUTCH FOR A HYBRID DRIVE

BACKGROUND AND SUMMARY OF THE INVENTION

The present invention relates to a double clutch for a hybrid drive of a motor vehicle. In addition, the present invention relates to a motor vehicle with such a double clutch.

In general, a hybrid vehicle is a vehicle that uses a plurality of energy sources, for example an internal combustion engine and an electric motor. In order to be able to achieve the highest possible energy efficiency, hybrid vehicles typically use so-called parallel hybrid drives, which enable the electric motor and the internal combustion engine to convey torque to a transmission not only alternatively, but also cumulatively. In contrast to a serial hybrid drive, wherein energy is converted first from the mechanical energy of the internal combustion engine into electric energy and then is used for operating the electric motor, a parallel hybrid drive does not always work at an optimal working point because the internal combustion engine and the electric motor are coupled together mechanically by a transmission. Therefore, the use of a double clutch transmission has been proposed in the past.

For example, DE 10 2004 062 530 A1 discloses such a double clutch transmission that is designed so that, in accordance with a respective operating state while achieving a high efficiency, the double clutch transmission can convey a torque from the electric motor and/or a torque from the internal combustion engine to the drive train.

An object of the present invention is to provide an improved double clutch that has, especially when used in a hybrid drive, a compact design.

The invention is based on the general idea of replacing two clutches that are usually arranged on the drive end and output end of the electric motor, with a commercially available double clutch in a parallel hybrid drive for a motor vehicle. Thereby, the overall length of the drive train is significantly shortened. In so doing, the double clutch that is used has an input shaft that can be driven by an internal combustion engine, and an output shaft that is connected to a transmission. In addition, there is an intermediate shaft that can be driven by an electric motor and extends coaxially to the output shaft. The input shaft and the intermediate shaft can be coupled together by a first clutch of the double clutch, whereas the intermediate shaft and the output shaft can be coupled together by a second clutch of the double clutch. At the same time, the electric motor is drive-connected directly to the intermediate shaft. Thus, individual operating states can be easily realized by an operating state-dependent opening or closing of the two clutches of the double clutch. For example, one can drive purely with the internal combustion engine, provided both clutches are closed, and the electric motor is not energized. In this state, the electric motor can act as the generator and charge up an energy accumulator. If no driving torque is supposed to be conveyed to the transmission, the second clutch can be opened; and the electric motor can be driven by the internal combustion engine over the closed first clutch and can be used for charging the energy accumulator. In a purely electric driving mode, however, only the second clutch is closed and the first clutch is opened so that the internal combustion engine is uncoupled from the electric motor. In a boost mode, both couplings are closed and both the electric motor and the internal combustion engine convey a torque to the transmission.

Expediently the output shaft extends coaxially through the electric motor. In this way an especially compact and constructionally space-minimizing configuration can be achieved, because, contrary to the prior art, the electric motor is arranged closely adjacent to the double clutch and is not installed apart from the double clutch as a result, of which additional torque transmitting elements would otherwise have to be provided. In particular, the close arrangement of the electric motor and clutch also reduces the weight, a feature that, in addition to the negligible constructional space requirement, is especially advantageous, in particular, in sports car construction.

Another advantageous embodiment of the present invention arranges the input shaft coaxially to the output shaft. The coaxial orientation of the input and output shaft offers the significant advantage that it is not necessary to redirect the power, for example with the aid of a cardan joint; and, as a result, only small transmission and/or translation losses occur.

BRIEF DESCRIPTION OF THE DRAWINGS

Other objects, advantages and novel features of the present invention will become apparent from the following detailed description of the invention when considered in conjunction with the accompanying drawings.

FIGS. 4a to 4d are schematic diagrams of various operating states of the inventive double clutch with the additional third clutch shown in FIG. 3.

DETAILED DESCRIPTION OF THE DRAWINGS

Figure 1:
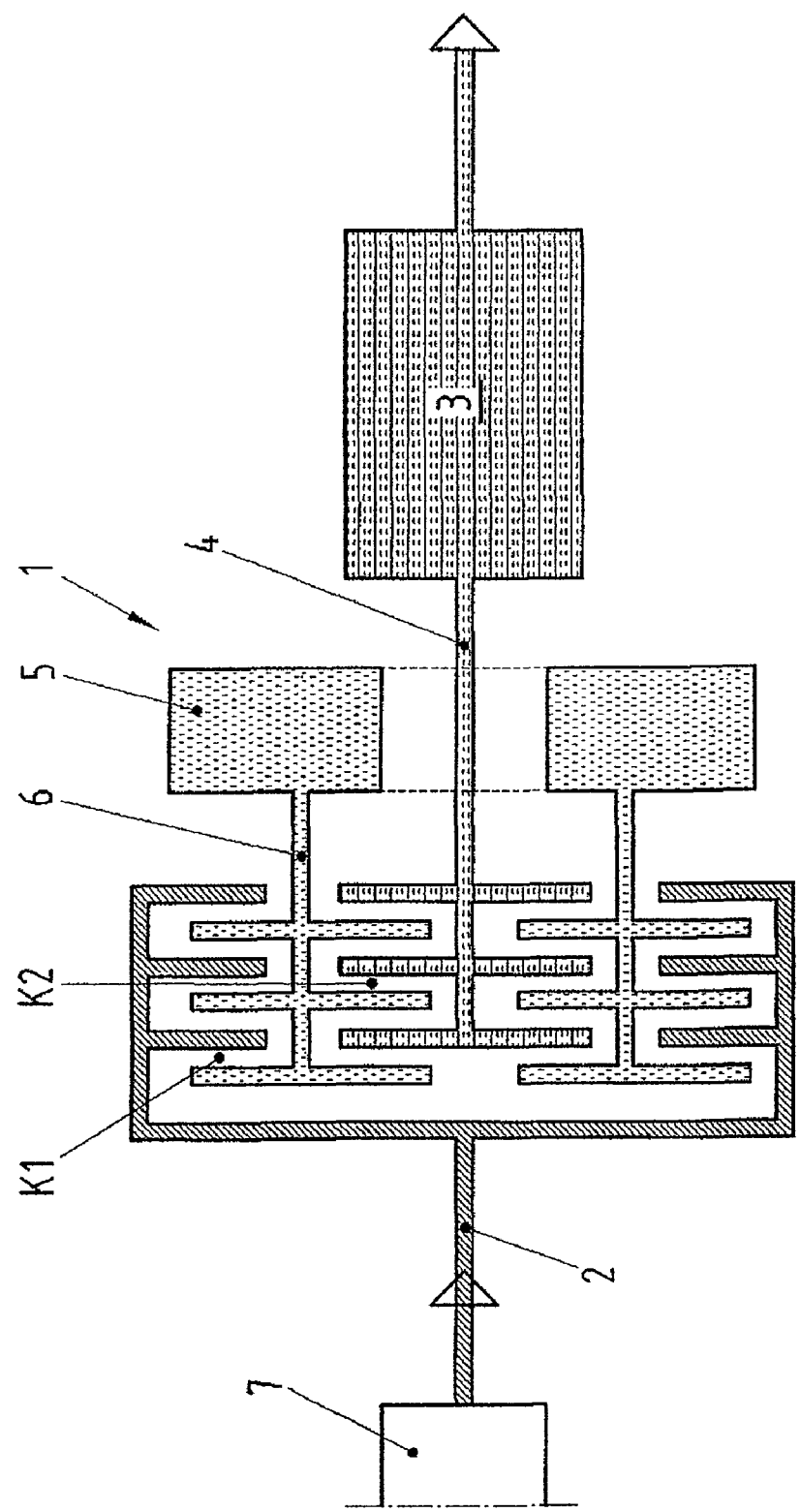
FIG. 1 is a schematic diagram of an double clutch for a hybrid vehicle according to the present invention.

According to FIG. 1, a double clutch 1 according to the present invention for a hybrid drive of a motor vehicle has an input shaft 2 that can be driven by an internal combustion engine 7. On the output end the double clutch 1 has an output shaft 4 that is connected to a transmission 3. Therefore, the input shaft 2 and the output shaft 4 are arranged, as seen in FIG. 1, coaxially to each other. Furthermore, the double clutch 1 has an intermediate shaft 6 that can be driven by an electric motor 5 and extends coaxially to the output shaft 4. Therefore, the intermediate shaft 6 is also arranged coaxially to the input shaft 2 and/or to the output shaft 4. Furthermore, the intermediate shaft 6 is preferably a hollow shaft, inside of which the output shaft 4 runs.

Generally, the double clutch 1 has two clutches, i.e., a first clutch K1 and a second clutch K2. The first clutch K1 is arranged between the input shaft 2 and the intermediate shaft 6 and connects in the closed state the two shafts 2, 6. The intermediate shaft 6 and the output shaft 4 can be coupled together via the second clutch K2 of the double clutch 1. In so doing, the electric motor 5 is connected directly to the intermediate shaft 6.

Therefore, the hybrid drive is configured preferably as a parallel hybrid drive in which the internal combustion engine 7 and the electric motor 5 can convey the torque to the transmission 3 not only alternatively, but also cumulatively.

The double clutch 1 of the present invention makes it possible to integrate a serial double clutch in a hybrid drive and, thus, to save on the cost of two clutches, which in the past were installed separately and which were usually arranged on the drive end and on the output end of the electric motor 5. In particular, the inventive double clutch 1 permits a significantly more compact design of the drive train of the hybrid drive, a feature that is especially advantageous from the viewpoint of the increasingly diminishing construction space that is available.

Figure 2:
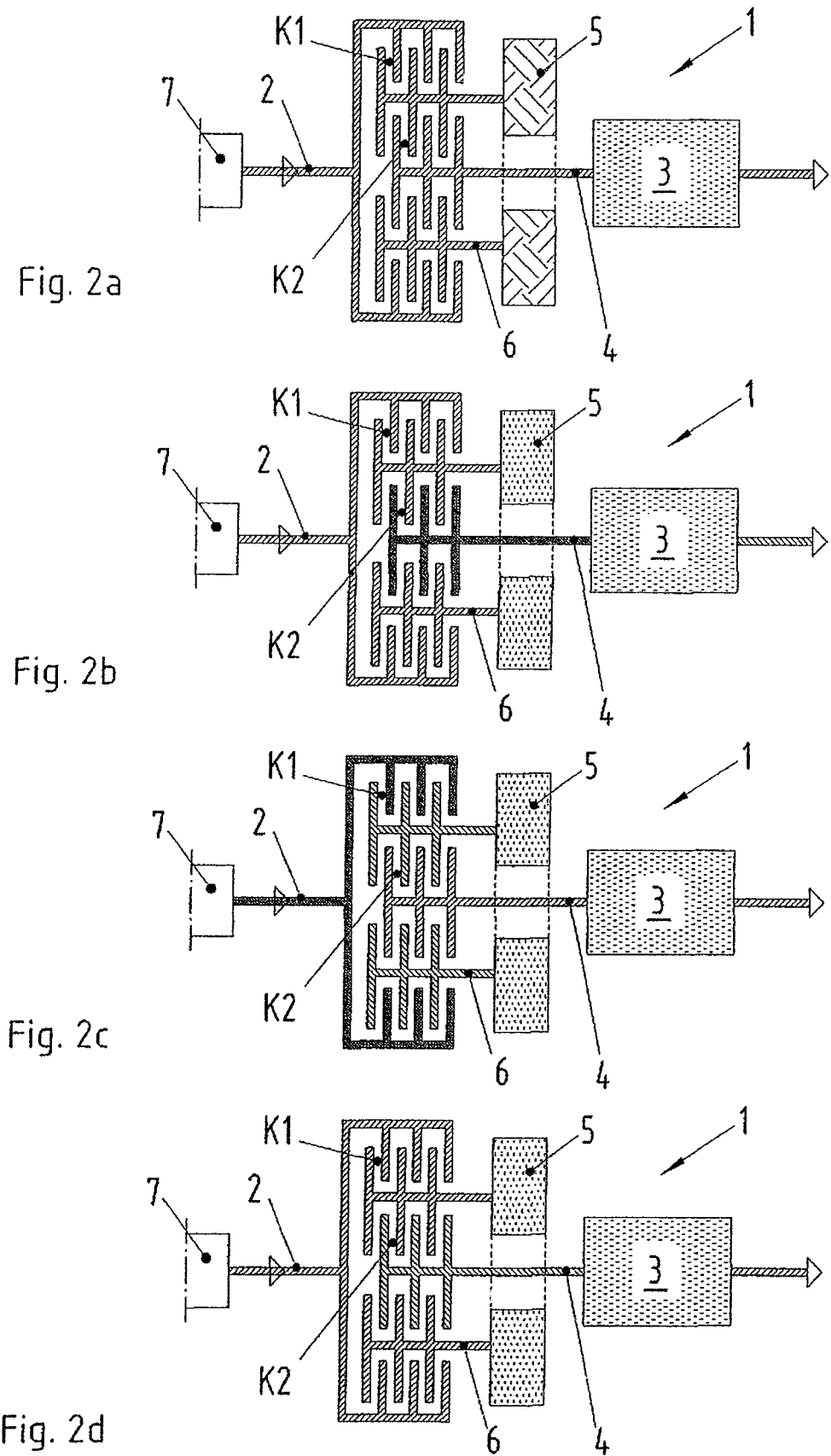
FIGS. 2a to 2d are schematic diagrams of various operating states of the double clutch shown in FIG. 1.

At this stage FIGS. 2a to 2d depict a number of different operating states of the double clutch 1 and/or the hybrid drive. In FIG. 2a, both the first clutch K1 and the second clutch K2 of the double clutch 1 are closed; and the electric motor 5 is switched off. In this state, the associated motor vehicle provided with the above-described hybrid drive is driving purely by the internal combustion engine. At the same time, the electric motor 5 can be used as the generator and charge an energy accumulator (not illustrated) for example, a vehicle battery. Therefore, in the operating state, according to FIG. 2a, the internal combustion engine 7 drives the input shaft 2, the torque of which is transmitted to the intermediate shaft 6 owing to the closed clutch K1. Since the intermediate shaft 6 is connected directly to the electric motor 5, the internal combustion engine 7 also drives the electric motor 5. Due to the second clutch K2 which is also closed, the torque transmitted from the input shaft 2 to the intermediate shaft 6 is also transmitted to the output shaft 4 which is drive-connected to the transmission 3.

FIG. 2b shows a charge operating state, in which the motor vehicle, having the inventive hybrid drive is not moving. Therefore, the torque is generated by the internal combustion engine 7 and is transmitted to the input shaft 2. Since the clutch K1 is closed, the torque is passed on to the intermediate shaft 6 and thus to the electric motor 5 which in this case is used exclusively as the generator for charging the vehicle battery. The second clutch K2 of the double clutch 1 is opened so that no torque is transmitted from the intermediate shaft 6 to the output shaft 4 and/or the transmission 3.

FIG. 2c shows an electric motor operating state, in which the motor vehicle is operated purely by electric apparatus. Thus, the electric motor 5 generates a torque that is passed on to the intermediate shaft 6. Due to the closed clutch K2, the torque is transmitted from the intermediate shaft 6 to the output shaft 4 and, thus, to the transmission 3. In contrast, the first clutch K1 is opened, so that no torque can be transmitted from the intermediate shaft 6 to the input shaft 2 and, thus, to the internal combustion engine 7. However, it is contemplated that at the start of the internal combustion engine 7 the first clutch K1 is closed; and the second clutch K2 is at least slightly opened, so that the electric motor 5 can start and/or "tow start" the internal combustion engine 7.

FIG. 2d shows a so-called boost operating state, in which both the first clutch K1 and the second clutch K2 of the double clutch 1 are closed, and both the internal combustion engine 7 and the electric motor 5 generate a torque. The torque, generated by the internal combustion engine 7 is transmitted to the intermediate shaft 6 via the input shaft 2 owing to the closed clutch K1. At the same time the intermediate shaft is driven by the electric motor 5. Then owing to the closed second clutch K2, the cumulative torque to the intermediate shaft 6 is transmitted to the output shaft 4 and, thus, to the transmission 3. Such a boost operating state can be practical, for example, when an especially fast acceleration of the motor vehicle is supposed to be achieved; or if due, for example, to the batteries being at least partially discharged, the power of the electric motor 5 by itself no longer suffices to drive the motor vehicle.

Figure 3:
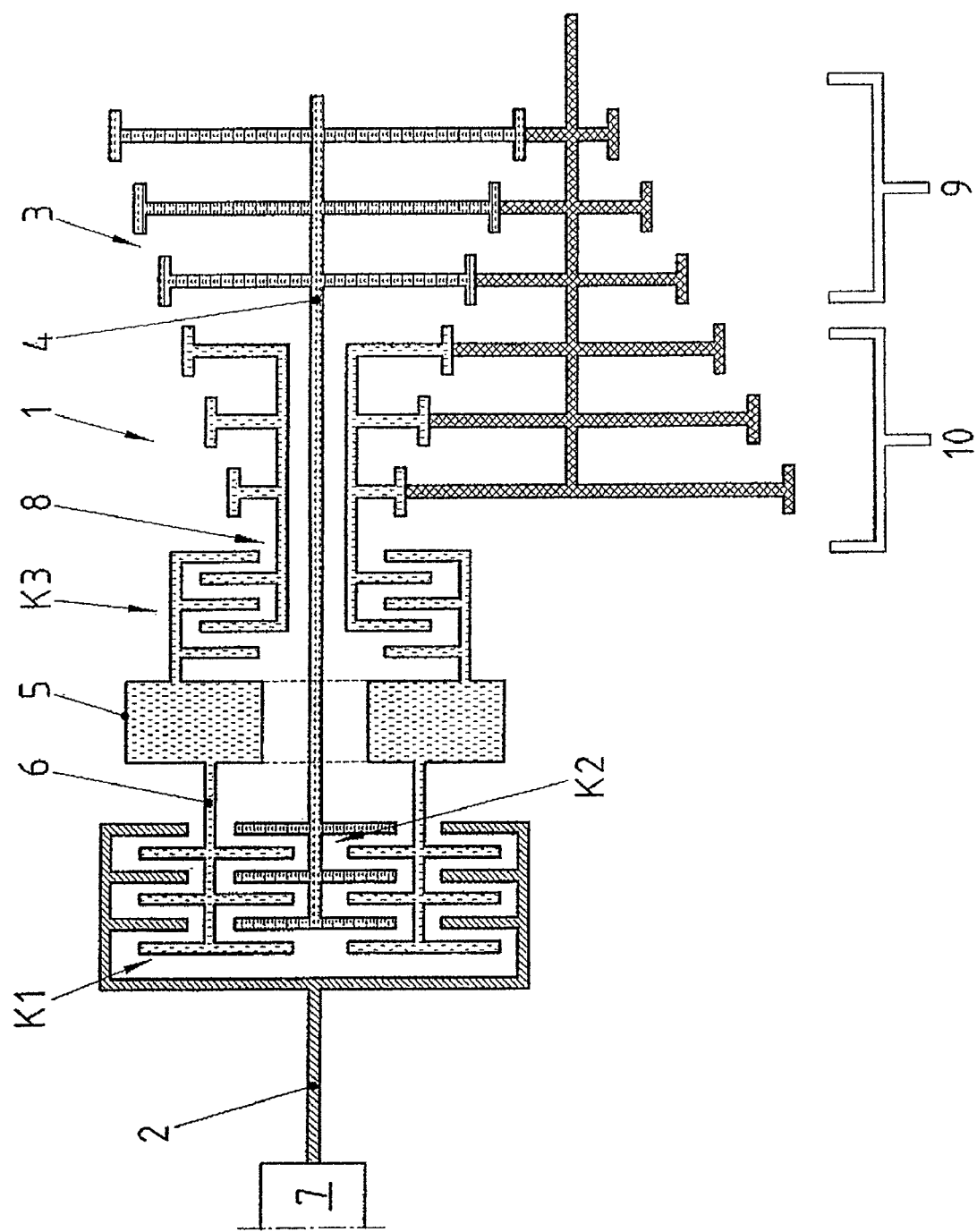
FIG. 3 is a schematic diagram of an double clutch according to the present invention with an additional third clutch.

FIG. 3 shows another embodiment of a double clutch 1 according to the present invention. Here, the same numerals used in FIG. 1 are used to denote similar parts. In this embodiment, however, a third clutch K3 is arranged between the electric motor 5 and the external output shaft 8 that extends coaxially to the output shaft 4 in the direction of the transmission 3. Thus, the output shaft 4 of the double clutch 1 can be drive-connected to a first group 9 of gears, for example with odd gears; and the external output shaft 8, to a second group 10 of gears, for example with even gears.

FIGS. 4a to 4d show in turn various operating states. FIG. 4a shows an internal combustion engine drive state, in which the two clutches K1 and K2 of the double clutch 1 are closed, whereas the third clutch K3 is opened. At the same time, the electric motor 5 is switched off. A torque is transmitted from the internal combustion engine 7 to the input shaft 2 and from the input shaft 2 over the first clutch K1 to the intermediate shaft 6 and over the second clutch K2 to the output shaft 4. Therefore, the output shaft 4 can be drive-connected preferably to the first group 9 of gears thus, for example, the odd gears. Since the intermediate shaft 6 and, thus, the electric motor 5 are also driven by the internal combustion engine 7, in this operating state the electric motor 5 can be used as the generator for charging the vehicle battery.

FIG. 4b shows a combustion drive state, in which the second group 10 of gears thus, for example, the even gears can be driven by the internal combustion engine 7. To this end, the first clutch K1 of the double clutch 1 is closed, just like the third clutch K3. The electric motor 5 is switched off. In the operating state of FIG. 4b, a torque is transmitted from the internal combustion engine 7 to the input shaft 2 and over the closed first clutch K1 of the double clutch 1 to the intermediate shaft 6. The intermediate shaft 6 is drive-connected directly to the electric motor 5 and over the closed third clutch K3 to the external output shaft 8. In this operating state the electric motor 5 can also be used as the generator for charging a vehicle battery. Therefore, driving in this operating state takes place exclusively by way of the internal combustion engine in the second group 10 of gears for example, in the even gears.

FIG. 4c shows an electric drive state, in which only the second clutch K2 of the double clutch 1 is closed, whereas the first clutch K1 and the third clutch K3 are opened. In this electric drive state the internal combustion engine 7 is switched off. At the same time the electric motor 5 generates a torque which it transmits to the intermediate shaft 6 and over the closed clutch K2 to the output shaft 4. Hence, the output shaft 4 can be connected to the first group 9 of gears.

FIG. 4d also shows an electric drive state, in which the electric motor 5 generates a torque which, due to the closed third clutch K3, is transmitted to the external output shaft 8 and, thus, to the second group 10 of gears. The first clutch K1 and the second clutch K2 of the double clutch 1 are opened, so that a torque cannot be transmitted from the intermediate shaft 6 to either the input shaft 2 or the output shaft 4.

In order to restart the internal combustion engine 7, in an electric drive state, according to FIGS. 4c and 4d, the first clutch K1 of the double clutch 1 can be closed, so that the electric motor 5 tow starts the internal combustion engine 7.

The common feature of all of the illustrated embodiments of the double clutch 1 according to the present invention is that the output shaft 4 extends coaxially through the electric motor 5; and, thus, an especially compact construction can be achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Double clutch for a hybrid drive of a motor vehicle, comprising
   an input shaft configured to be driven by an internal combustion engine,
   an output shaft operatively connected to a transmission, and
   an intermediate shaft configured to be driven by an electric motor and extending coaxially to the output shaft, the input shaft and the intermediate shaft being coupleable by a first clutch of the double clutch, and the intermediate shaft and the output shaft being coupleable by a second clutch of the double clutch.

2. Double clutch as claimed in claim 1, wherein the input shaft is coaxial to the output shaft.

3. Double clutch as claimed in claim 1, wherein the hybrid drive is a parallel hybrid drive, in which the internal combustion engine and the electric motor are able to convey torque to the transmission both alternatively and cumulatively.

4. Double clutch as claimed in claim 1, wherein, in a combustion drive state, the first and the second clutch of the double clutch are arranged to be closed, and the electric motor is in a switched off state.

5. Double clutch as claimed in claim 1, wherein, in an electric drive state, only the first clutch of the double clutch is in a closed state.

6. Double clutch as claimed in claim 1, wherein, in a charge state, at least the first clutch of the double clutch is in a closed state, and the electric motor is configured to be used as a changing generator.

7. Double clutch as claimed in claim 1, wherein, in a boost state, the first and the second clutch of the double clutch are in a closed state, and the output shaft is arranged to be driven by the internal combustion engine and the electric motor.

8. Double clutch as claimed in claim 1, wherein a third clutch is arranged between the electric motor and an external output shaft that extends coaxially to the output shaft in a direction of the transmission.

9. Double clutch as claimed in claim 8, wherein the output shaft of the double clutch is drive-connected to a first group of gears; and the external output shaft is drive-connected to a second group of gears of the transmission.

10. Double clutch as claimed in claim 9, wherein, in a combustion drive state for driving the transmission in a gear of the first group, only the first and the second clutch of the double clutch are in a closed state, and for driving the transmission in a gear of the second group, only the first and the third clutch of the double clutch are in a closed state; and the electric motor is in a switched off state.

11. Double clutch as claimed in claim 9, wherein, in an electric drive state for driving the transmission in a gear of the first group, only the second clutch of the double clutch is in a closed state, and for driving the transmission in a gear of the second group, only the third clutch of the double clutch is in a closed state; and the internal combustion engine is in a switched off state.

12. Double clutch as claimed in claim 1, wherein the output shaft is arranged to extend coaxially through the electric motor.

13. Double clutch as claimed in claim 8, wherein the output shaft is arranged to extend coaxially through the electric motor.

14. Motor vehicle comprising a double clutch, as claimed in claim 1.

15. Motor vehicle comprising a double clutch, as claimed in claim 8.

* * * * *